United States Patent [19]

Clemens

[11] 3,841,678
[45] Oct. 15, 1974

[54] ENERGY ABSORBER HAVING EXTENSION JACK

[75] Inventor: William J. Clemens, Dearborn Heights, Mich.

[73] Assignee: Ford Motor Company, Dearborn, Mich.

[22] Filed: Apr. 12, 1973

[21] Appl. No.: 350,435

Related U.S. Application Data

[63] Continuation of Ser. No. 94,364, Dec. 2, 1970, abandoned.

[52] U.S. Cl. .................................. 293/1, 188/1 C
[51] Int. Cl. ............................................. B60r 19/04
[58] Field of Search ........... 293/60, 70, 73, 85, 89-1; 188/1 C, 1 D; 213/1 A

[56] References Cited
UNITED STATES PATENTS

| 1,655,976 | 1/1928 | Schmidt | 293/89 |
| 1,664,342 | 3/1928 | April | 293/73 |
| 2,603,517 | 7/1952 | Zitarosa | 293/89 |
| 3,369,634 | 6/1966 | Mazelsky | 188/1 C |
| 3,432,200 | 3/1969 | Barton | 293/71 R |

Primary Examiner—M. Henson Wood, Jr.
Assistant Examiner—Robert Saifer
Attorney, Agent, or Firm—Keith L. Zerschling; Clifford L. Sadler

[57] ABSTRACT

An energy absorber having a pair of nesting cylindrical members with energy absorbing means interposed between the members is constructed to absorb energy by telescopically collapsing. The energy absorber is provided with a screw jack for extending or resetting the cylindrical members after absorbing an impact load.

5 Claims, 4 Drawing Figures

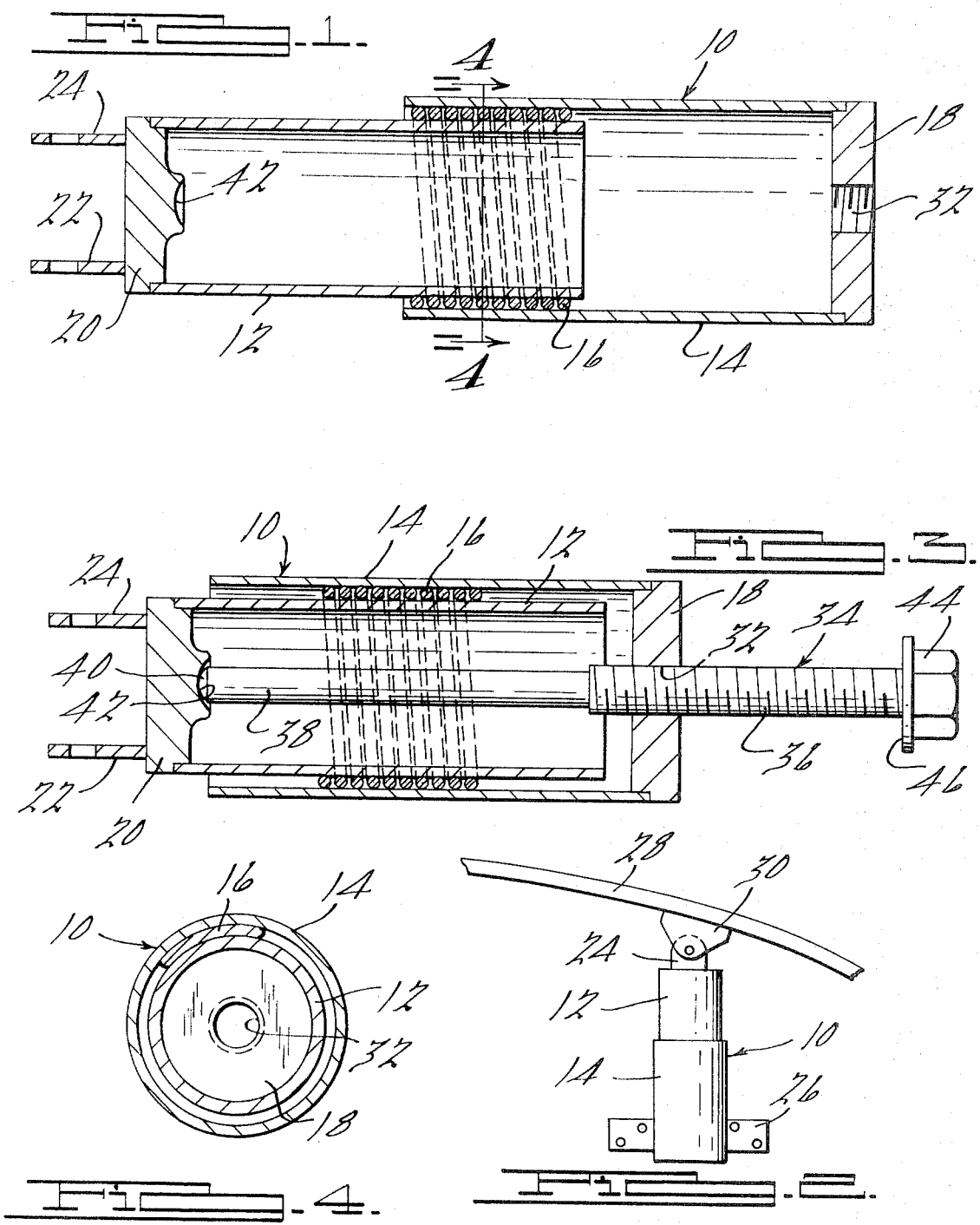

ENERGY ABSORBER HAVING EXTENSION JACK

This is a continuation of application Ser. No. 94,364 filed Dec. 2, 1970 and now abandoned.

BACKGROUND OF THE INVENTION

The present invention relates to energy absorbers of the telescopic type such as disclosed in U.S. Pat. No. 3,369,634. An energy absorber of this type has nesting cylindrical members with an energy absorbing element interposed between the members. Energy is absorbed by telescopically collapsing the cylindrical members and distorting or deforming the energy absorbing element therebetween. The device does not employ any resilient elements for absorbing energy and, therefore, means must be provided for returning the cylindrical members to their original position after an energy absorbing stroke.

BRIEF SUMMARY OF THE INVENTION

An energy absorber of the type disclosed in U.S. Pat. No. 3,369,634 may be used for a variety of applications such as supporting a motor vehicle bumper. A mechanism of this type is constructed to telescopically collapse to absorb an impact load exerted agaist the vehicle bumper. The device of U.S. Pat. No. 3,369,634, however, does not include a means for resetting it after it has collapsed. Therefore, in accordance with the present invention, means are provided for extending the energy absorber from a telescoped condition. In the preferred embodiment of this invention, the means comprises a screw jack having a stem portion inserted into the interior of the telescopic cylinders and with its end engaging the closure member of the inner cylinder. The screw jack also has a threaded portion that threadedly engages the closure member of the outer cylindrical member. By rotating the screw jack, the cylindrical members are forcibly separated and the device is extended to its original length.

BRIEF DESCRIPTION OF THE DRAWINGS

The many objects and advantages of the present invention will become apparent from the following detailed description and the accompanying drawings, in which:

FIG. 1 is an elevational view, in section, showing a telescopic energy absorber;

FIG. 2 is a top plan view of an energy absorbing bumper system for a motor vehicle having an energy absorber of the type shown in FIG. 1;

FIG. 3 is an elevational view, in section, of the telescopic energy absorber shown in a collapsed condition and in combination with a screw jack constructed to extend the absorber to its original length; and FIG. 4 is a sectional view taken along section lines 4—4 of FIG. 1.

DETAILED DESCRIPTION OF THE PREFERRED EMBODIMENT

Referring now to the drawings for a detailed description of the presently preferred embodiment, FIG. 1 discloses a telescopic energy absorber 10. The energy absorber 10 may be of the type disclosed in U.S. Pat. No. 3,369,634. Energy absorber 10 includes an inner cylindrical member 12 that is telescopically fitted within an outer cylindrical member 14. Energy absorbing means is interposed between the cylindrical members 12 and 14. In this embodiment, the energy absorbing means comprises a helical wire 16 that is wound around the inner cylindrical member 12. As indicated in the drawing FIG. 1, the outside diameter of the inner cylinder 12 and the inside diameter of the outer cylinder are dimensioned to provide an annular space between the two cylinders. The helical wire 16 is situated in the annular space between the cylinders and engages them with a slight interference fit.

A closure member 18 is secured to the outer end of the outer cylinder 14. A closure member 20 is fitted to the opposite end of the cylinder 12. The closure member 20 is provided with spaced arms 22 and 24 that combine to form a yoke or attachment clevice. As seen in FIG. 2, the energy absorber 10 has flanges 26 secured to the outer cylinder 14 that are constructed to be attached to a chassis frame of a motor vehicle. A vehicle bumper bar 28 is provided with an attachment bracket 30. The bracket 30 is secured to the yoke or clevice 22, 24 of the inner cylinder 12 by means of a bolt. This provides a pivotal connection to permit the energy absorber 10 to accept impact loads that are offcenter of the bumper.

When an impact load is imposed upon the bumper and bumper support system of FIG. 2, the energy absorber 10 will telescopically collapse. The inner cylinder 10 will be axially displaced toward the end closure 18 of the outer cylinder 14. When this movement takes place, the wire helix 16 will be subject to cyclic plastic deformation as it rolls about its own axis whereby the kinetic energy of the impact will be absorbed as explained in U.S. Pat. No. 3,369,634.

In FIG. 3, it is seen that the closure member 18 is provided with a threaded hole 32. A screw jack 34 has a threaded portion 36 engaging the threaded hole 32 and a stem portion 38 extending into the interior of the energy absorber 10. The end 40 of the stem portion 38 is rounded and seats in socket 42 formed in the closure member 20 of the cylinder 12. The outer end of the screw jack 34 is formed with hexagonal head 44 for engagement by a tool to facilitate turning of the screw.

OPERATION

After the energy absorber 10 has telescoped under an impact load, its several components are displaced from the orientation shown in FIG. 1 to the collapsed condition shown in FIG. 3. In order to reset or extend the energy absorber 10 so that it will be in a condition to absorb another impact load, the screw jack 34 is used. The stem 38 is inserted through the threaded hole 32 until the threads of the portion 36 engage the threads of the hole 32. A tool, such as a wheel lug wrench for the vehicle, is used to rotate the screw jack 34 by engagement with the hexagonal tool receiving end 44. Rotation of the screw jack 34 will cause it to extend into the interior of the energy absorber 10 with the rounded portion 40 being seated in the socket 42 of the end closure 20. The screw jack 34 is rotated by the tool until the underside 46 of the head 44 comes into flush engagement with the end closure 18.

The screw jack 34 is dimensioned so that when it is fully inserted into the energy absorber 10, the absorber will be extended to its full operative length as shown in FIG. 1. After the energy absorber 10 has been extended, the screw jack 34 is withdrawn. The system is then fully operative to absorb another impact load.

SUMMARY

A telescopic energy absorber of the type disclosed in FIG. 1 has the advantage of being of inexpensive construction. As a bumper support, however, it has the disadvantage that it remains collapsed after absorbing the energy of an impact. In keeping with the character of the energy absorber 10, the present invention provides a means for extending the absorber to a preset length that is economical and operates in an efficient manner.

The foregoing description presents the presently preferred embodiment of this invention. Alterations and modifications may occur to those skilled in the art that will come within the scope and spirit of the following claims.

I claim:

1. An energy absorber comprising first and second telescopically related cylindrical members, energy absorbing means interposed between said members, said cylindrical members being displacable relative to each other from an extended position to a collapsed position, said energy absorbing means being constructed to absorb energy as said cylindrical members move from said extended position to said collapsed position, screw jack means constructed to move said cylindrical members from said collapsed position to said extended position, each of said cylindrical members having a closure member, said screw jack means being interposed between said closure members and threadedly engaging one of said closure members, said screw jack means being rotatable whereby said cylindrical members are displaced from said collapsed position to said extended position.

2. An energy absorber according to claim 1 and including:
    said screw jack having a tool receiving portion, said screw jack being dimensioned whereby said tool receiving portion engages one of said closure members when said energy absorber is fully extended.

3. An energy absorber according to claim 1 and including:
    the other of said closure members having a socket, said screw jack means having one end seated in said socket.

4. An energy absorber according to claim 1 and including:
    the other of said closure members having a socket, said screw jack having one end seated in said socket, said screw jack having a tool receiving portion, said screw jack being dimensioned whereby said tool receiving portion engages one of said closure members when said energy absorber is fully extended.

5. A motor vehicle bumper system comprising a bumper bar, vehicle body structure, an energy absorber interposed between said bar and vehicle body structure, said energy absorber comprising first and second telescopically related cylindrical members, one of said members being constructed to be connected to said vehicle body structure and the other of said members being constructed to be connected to said bumper bar, energy absorbing means interposed between said cylindrical member, said cylindrical members being displacable relative to each other from an extended position to a collapsed position, said energy absorbing means being constructed to absorb energy as said cylindrical members move from said extended position to said collapsed position, each of said cylindrical members having a closure member, a screw jack means constructed to threadedly engage one of said closure members, the other of said closure members having a socket, said screw jack means having one end seated in said socket, the other end of said screw jack means having a tool receiving portion, said screw jack means being rotatable whereby said cylindrical members are displaced from said collapsed position to said extended position, said screw jack means being dimensioned whereby said tool receiving portion engages said one closure member when said energy absorber is fully extended.

* * * * *